US 6,564,072 B1

(12) United States Patent
Attimont et al.

(10) Patent No.: US 6,564,072 B1
(45) Date of Patent: May 13, 2003

(54) RADIO TELECOMMUNICATION TERMINAL

(75) Inventors: Luc Attimont, Le Port Marly (FR);
Jannick Bodin, Garches (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/423,212

(22) PCT Filed: Mar. 4, 1999

(86) PCT No.: PCT/FR99/00489

§ 371 (c)(1),
(2), (4) Date: Nov. 3, 1999

(87) PCT Pub. No.: WO99/45743

PCT Pub. Date: Sep. 10, 1999

(30) Foreign Application Priority Data

Mar. 5, 1998 (FR) .............................. 98 02684

(51) Int. Cl.⁷ ................................. H04M 1/00
(52) U.S. Cl. .............. 455/569; 379/390.01; 379/388.04
(58) Field of Search ................. 455/567, 569, 455/552, 566, 575, 90; 379/388.05, 388.02, 428.01, 388.04, 392, 390.01, 391

(56) References Cited

U.S. PATENT DOCUMENTS

| | | | |
|---|---|---|---|
| 3,938,617 A | | 2/1976 | Forbes |
| 5,224,151 A | * | 6/1993 | Bowen et al. .............. 455/569 |
| 5,448,620 A | * | 9/1995 | Gershkovich et al. ....... 455/552 |
| 5,515,432 A | * | 5/1996 | Rasmusson ............ 379/388.01 |
| 5,640,450 A | * | 6/1997 | Watanabe .................... 379/392 |
| 5,794,163 A | * | 8/1998 | Paterson et al. ............. 455/568 |
| 5,844,983 A | * | 12/1998 | Lilja ........................... 379/418 |
| 5,905,964 A | * | 5/1999 | Sudo ........................... 455/566 |
| 5,907,622 A | * | 5/1999 | Dougherty .................... 381/57 |
| 5,910,996 A | * | 6/1999 | Eggers et al. ................ 381/107 |
| 5,912,965 A | * | 6/1999 | Boyer ......................... 379/390 |
| 6,002,949 A | * | 12/1999 | Hawker et al. .............. 455/569 |
| 6,125,288 A | * | 9/2000 | Imai ............................ 455/569 |

FOREIGN PATENT DOCUMENTS

| | | |
|---|---|---|
| DE | 195 44 658 C1 | 3/1997 |
| EP | 0 171 065 A2 | 2/1986 |
| GB | 2 264 748 A | 9/1993 |
| WO | WO 94/13065 | 6/1994 |

* cited by examiner

*Primary Examiner*—Dwayne Bost
*Assistant Examiner*—Joy K. Contee
(74) *Attorney, Agent, or Firm*—Sughrue Mion, PLLC

(57) ABSTRACT

The invention relates to a mobile radio terminal including an audio transducer (5) an outlet (6) of which is oriented towards the front face of the terminal and provides earpiece, loudspeaker and ringer functions, the terminal further including, coupled to the transducer, means (R1, 9', 11, 12) for adjusting the level of the sound wave emitted by the transducer in a main direction (D) substantially perpendicular to the front face, the adjustment being effected regardless of the position of the terminal relative to a user.

22 Claims, 1 Drawing Sheet

RADIO TELECOMMUNICATION TERMINAL

BACKGROUND OF THE INVENTION

The invention relates to a mobile radio terminal.

To be more precise, the expression "mobile radio terminal" means a cordless telephone terminal or a GSM mobile terminal, but this definition is not limiting on the invention.

The invention applies more particularly to mobile radio terminals which provide all three of the earpiece, loudspeaker, and ringer functions, and which guarantee compliance with safety rules imposed to protect the user.

The safety rules specify in particular that the level of the ringing signal must not exceed a predetermined threshold when the user's ear is near the means providing the ringer function (acoustic shock). Paradoxically, the ringing level must be amplified when the terminal is not near the user's ear so that the user can hear the ringing signal. The same applies to the voice signal when the terminal is being used in loudspeaker mode.

To this end a GSM mobile radio terminal usually incorporates an audio transducer to provide the earpiece and loudspeaker functions and a component such as a ringer or vibrator separate from the transducer to provide the ringer function. The ringer or vibrator is sited away from the transducer to prevent acoustic shock. However, its presence significantly increases the overall size of the terminal and leads to a non-negligible increase in the unit cost of the terminal.

Also, this does not solve the loudspeaker problem.

U.S. Pat. No. 4,504,701 describes a cordless telephone terminal including a ringing signal processor circuit and an audio amplifier connected to a receiver emitting a voice signal and a ringing signal. To protect the user from acoustic shock, the terminal further includes a gravity switch connected in parallel with an attenuator resistor between the ringing signal processor circuit and the amplifier. When the terminal is on its base, or out of its base but in a substantially horizontal position, the gravity switch is in a predetermined position in which the ringing signal is transmitted to the amplifier and thus to the receiver without modifying it. When the terminal is removed from its base and is in a substantially vertical position the switch is in the open position so that the ringing signal is attenuated by the parallel resistor to a predetermined level preventing acoustic shock. The attenuated signal is transmitted to the transducer via the amplifier.

In other words, the ringing signal is unmodified when the terminal is on its base or off its base but in a horizontal position, while it is attenuated when the terminal is not on its base and is in a vertical position, as it may well be when it is near the user's ear.

However, the ringing level is adjusted according to the position of the terminal, which does not allow for the position of the user.

The terminal may be in a vertical position without being on its base in situations other than when it is near the user's ear, for example when it is placed on a table. The ringing signal is then attenuated even though the terminal is not near the user and as a result the user may not hear it ringing.

Conversely, the terminal can be in a horizontal position and also near the user's ear, for example if the user is lying down.

For the same reasons, a gravity switch in parallel with a resistor cannot be effectively applied to mobile terminals which are often in a vertical position at a distance from the user, in a bag, a pocket or the like.

Also, the device described in the above document provides no means of adjusting the loudspeaker output signal.

Finally, the above device requires additional components, such as the resistor and the switch, which add to the overall size and the cost of the terminal.

Document WO 94/13065 relates to a device for adapting the level of a voice signal to suit the position of the terminal, which is either a hands-free position or a conventional listening position. To this end the device includes switches which set the voice signal to a first level, for example a low level, if the position is the conventional listening position or a second level, for example a high level, if the position is a hands-free position.

The document addresses the problem of acoustic shock. However, the means for solving the problem have the drawback that they are electromechanical, and therefore bulky, and require a terminal to be provided with a flap for defining the hands-free and conventional listening positions.

Document EP 0 171 065 concerns an acoustic feedback device for a loudspeaker. The idea is to place a microphone on the loudspeaker diaphragm in order to regulate the output level of the loudspeaker, i.e. to maintain it as constant as possible. The objective is in fact to improve prior art regulator devices in which the microphone faces the loudspeaker but is at a distance from it.

Consequently, the problem addressed by that second document is the exact opposite of that addressed by this application, which is how to modify the level according to certain parameters.

SUMMARY OF THE INVENTION

The object of the invention is therefore to alleviate the above drawbacks.

The invention consists in a cordless or mobile telephone terminal generating a ringing signal or a voice signal at a level which prevents acoustic shock.

The invention also concerns a compact low-cost mobile radio terminal.

To this end, the invention proposes a mobile radio terminal including an audio transducer providing earpiece and loudspeaker functions and an outlet of which is oriented towards the front face of the terminal, characterized in that the audio transducer additionally provides a ringer function and in that the terminal further includes, coupled to the transducer, means for adjusting the level of the sound wave emitted by the transducer in a main direction substantially perpendicular to the front face, the adjustment being effected regardless of the position of the terminal relative to a user and so that said level is sufficient for distant use of the terminal and less than a predetermined value for close use.

In a first embodiment of the terminal the adjustment means include:

means for measuring a parameter representative of the degree of masking of the transducer, and means for determining the level of the sound wave that the transducer must produce given the measurement effected by the measuring means.

In a first variant the means for measuring a parameter representative of the degree of masking of the transducer comprise means for measuring the attenuation of background noise picked up by the microphone of the terminal.

In a second variant the means for measuring a parameter representative of the degree of masking of the transducer comprise means for measuring the impedance of the transducer.

In a second embodiment of the terminal the adjustment means include a guide member for the sound wave comprising a guide wall in which at least one guide hole is formed, the guide member being rigidly coupled to the front face of the terminal so that the guide hole faces the outlet of the transducer to limit the level of the sound wave emitted in the main direction and the guide wall and the front face of the terminal form a diversion channel for at least part of the sound wave in a secondary direction different to the main direction.

In a third embodiment of the invention the adjustment means include:

a flap in which the transducer is mounted and which is coupled to the front face of the terminal and mobile between an active position in which it bears against the front face and an inactive position in which it does not bear against the front face, means for detecting passage from the inactive position to the active position and vice-versa, and means for producing a signal for adjusting the level of the sound wave from the transducer according to the position of the flap.

The invention also proposes a method of adjusting the level of a sound wave produced by a transducer mounted in a mobile radio terminal as previously described, characterized in that the adjustment is effected in a main direction substantially perpendicular to the front face of the terminal and regardless of the position of the terminal relative to a user.

In a first implementation of the method the adjustment is effected in accordance with the degree of masking of the transducer.

To this end it comprises the steps of:

measuring a parameter representative of the degree of masking of the transducer, and adjusting the level of the sound wave that the transducer must provide accordingly.

In a second implementation of the method the adjustment is effected by diverting at least part of the sound wave in a secondary direction different from the main direction.

In a third implementation of the method the adjustment is effected by detecting a pressure difference applied to the front face of the terminal.

BRIEF DESCRIPTION OF THE DRAWINGS

The invention is explained in more detail in the following description of embodiments of the invention given by way of example only and with reference to the accompanying drawings.

DETAILED DESCRIPTION OF THE INVENTION

Figure 1A:
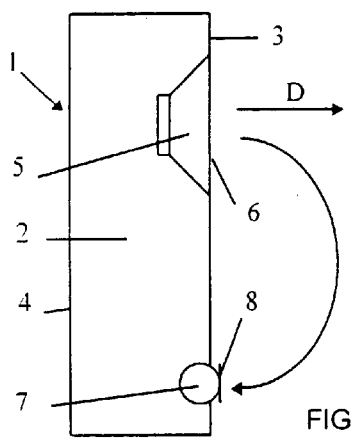
FIGS. 1a and 1b together constitute a diagram showing a terminal in accordance with the invention with a first embodiment of means for adjusting the level of the sound wave.

The terminal 1 includes a casing 2 which has a front face 3 and a rear face 4 and in which is mounted a transducer 5 whose outlet 6 is oriented towards the front face 3 of the terminal. The terminal further includes a microphone 7 whose inlet 8 likewise faces towards the front face 3 of the terminal.

The transducer 5 provides all three of the earpiece, loudspeaker, and ringer functions.

The objective is to adjust the level of the sound wave emitted by the transducer 5 to allow for the position of the terminal relative to a user, which is particularly difficult if the transducer is masked by the user's ear.

Here, "user" means any person liable to pick up the terminal, such as its owner or a third party, for example a child.

The object of the invention is to adjust the output level of the transducer 5 so that it is sufficient for the user to hear the ringer or the loudspeaker if the terminal is some distance away but does not cause acoustic shock if the transducer is masked by the user's ear.

To this end, the terminal includes means for adjusting the level of the sound wave emitted by the transducer in a main direction D substantially perpendicular to the front face 3 of the terminal, regardless of the position of the terminal relative to the user.

Figure 1B:
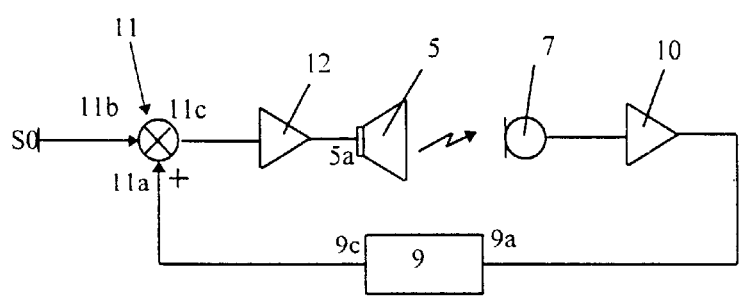
Figure 2:
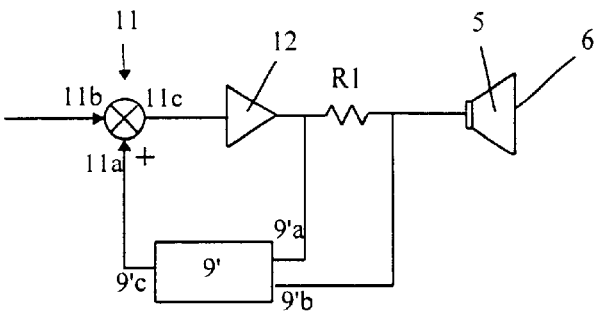
FIG. 2 is a block diagram of a variant of the first embodiment of the means shown in FIG. 1 for adjusting the level of the sound wave.

In a first embodiment of the invention, shown in FIGS. 1b and 2, the adjustment allows for the degree of masking of the transducer 5. To this end, the terminal includes means for measuring a parameter representative of the degree of masking and means for determining the level of the sound wave that the transducer must provide in the light of the measurement carried out by the measuring means.

In a first implementation, the measuring means include a measuring circuit 9 whose input 9a is connected to the microphone 7 of the terminal via an amplifier 10, the parameter representing the degree of masking of the transducer being the attenuation of background noise picked up by the microphone 7.

The measuring means further include a comparator circuit 11 having a first input 11a connected to the output 9c of the measuring circuit 9 and a second input 11b which receives a sound attenuation threshold value S0. The comparator circuit 11 has its output 11c connected via an adjustment circuit 12 to an input 5a of the transducer 5.

The measured value of background noise attenuation is compared to the threshold value S0, which corresponds to the attenuation caused by masking of the transducer by the user's ear. The adjustment circuit 12 adjusts the level of the sound wave emitted by the transducer 5 according to the result of the comparison. If the measured value of the attenuation is equal to the threshold value S0 the level is attenuated until the measured value of the attenuation is again different from the threshold value S0.

In a second implementation, the parameter representative of the degree of masking of the transducer is the impedance of the transducer.

To this end the measuring means include a measuring circuit 9' whose inputs 9'a and 9'b are connected to respective terminals of the internal resistance R1 of the transducer, this internal resistance representing the impedance of the transducer. An output 9'c of the measuring circuit 9' is connected to the first input 11a of the comparator circuit 11.

The second input 11b of the comparator circuit 11 receives an impedance threshold value S'0 corresponding to the impedance of the transducer when it is masked by the user's ear.

Of course, the invention is not limited to the above two ways of taking account of the degree of masking of the transducer. For example, the pressure or speed of the transducer diaphragm could be measured.

According to another feature of the invention, the adjustment means further include means for emitting a ringing burst whose level gradually increases to a level determined by the degree of masking of the transducer.

Accordingly, when an incoming call reaches the terminal 1, a ringing burst is emitted whose level increases gradually to a maximum level, during which process the sound attenuation is measured to determine the level of the sound wave that the transducer must supply given the degree to which it is masked.

Also, the sound attenuation can be measured cyclically.

In another embodiment of the invention the level of the sound wave emitted by the transducer in the main direction D is adjusted by diverting at least some of the sound wave in a secondary direction D' different to the main direction D.

Figure 3:
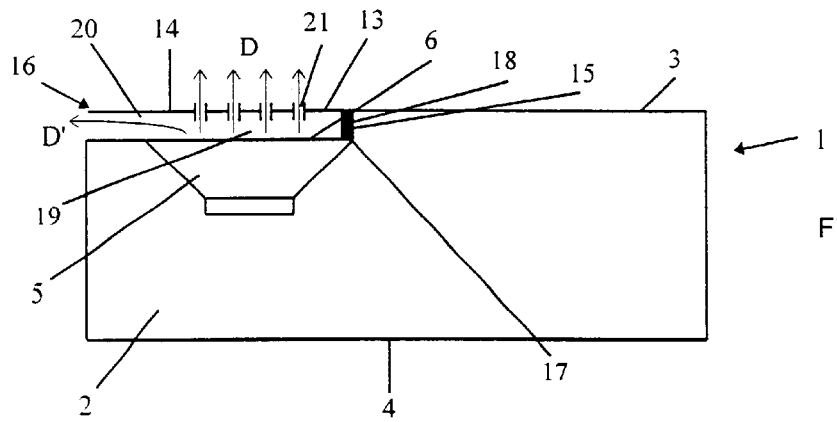
FIG. 3 is a diagram showing a second embodiment of means for adjusting the sound wave level.

To this end, as shown in FIG. 3, the adjustment means include a member 13 which guides the sound wave and comprises first and second guide walls 14 and 15 rigidly coupled together at one end and having respective free ends 16 and 17. The guide member is rigidly coupled to the front face 3 of the terminal 1 so that the first guide wall 14 is substantially parallel to the front face 3 and the second guide wall 15 is substantially perpendicular to the front face 3. For example, the front face 3 includes a substantially perpendicular shoulder 18 against which the second guide wall 15 is fixed. The guide member 13 and the front face 3 of the terminal therefore form a cavity 19 having a diversion channel 20 open on the same side as the free end 16 of the first guide wall 14.

Guide holes 21 are formed in the first guide wall 14, facing the outlet 6 of the transducer 5.

The guide holes 19 limit the level of the sound wave emitted in the main direction D, at least part of the sound wave being diverted in the secondary direction D' substantially parallel to the first wall 14.

Figure 4:
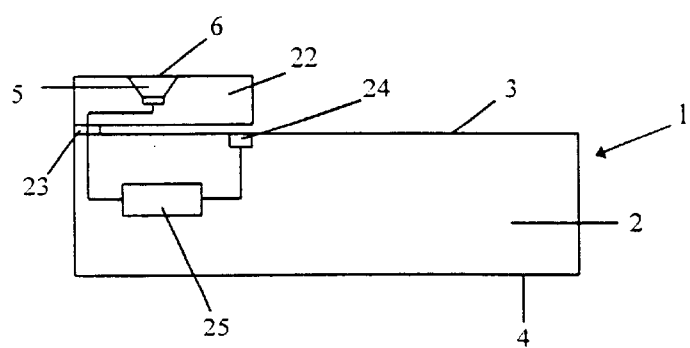
FIG. 4 is a diagram showing a third embodiment of means for adjusting the sound wave level.

In a third embodiment of the invention, shown in FIG. 4, the adjustment is effected on detecting a pressure difference applied to the front face of the terminal.

To this end, the adjustment means include a flap 22 in which the transducer 5 is mounted and which is coupled to the front face 3 of the terminal 1 by mechanical means 23 and mobile between an active position in which it bears against the front face 3 and an inactive position in which it does not bear against the front face 3. The mechanical means 23 move the flap 22 between these two positions according to the pressure applied to the flap, to distinguish between pressure due to the user's ear and pressure due to an object.

The adjustment means further include means 24 for detecting passage from the inactive position to the active position and vice-versa. The detector means can be a contact or pressure detector mounted on the front face 3 of the terminal facing the flap 22, for example, and producing a detection signal when the flap 22 comes into contact with the front face 3 of the terminal 1.

The output of the detector means is connected to an adjustment circuit 25 similar to the adjustment circuit 12 previously described and the level of the sound wave is adjusted accordingly. The level is attenuated for as long as the flap 22 is in contact with the front face 3 of the terminal 1.

Of course, the embodiments of the invention described can be combined with each other to reduce further the risk of acoustic shock.

What is claimed is:

1. A mobile radio terminal comprising an audio transducer providing earpiece and loudspeaker functions and an outlet that is oriented towards the front face of the terminal, wherein:

the audio transducer provides a ringer function; and the terminal further comprises, coupled to the transducer, means for adjusting the level of the sound wave emitted by the transducer in a main direction substantially perpendicular to the front face, wherein the sound wave level is adjusted regardless of the position of the terminal relative to a user and the sound wave level is sufficient for distant use of the terminal and is less than a predetermined value for close use, the adjustment means comprising a guide member for the sound wave comprising a guide wall in which at least one guide hole is formed, the guide member being coupled to the front face of the terminal so that the guide hole faces the outlet of the transducer to limit the level of the sound wave emitted in the main direction, and the guide wall and the front face of the terminal provide a diversion channel for at least part of the sound wave in a secondary direction different to the main direction.

2. A mobile radio terminal according to claim 1, wherein the adjustment means comprise:

means for measuring a parameter representative of the degree of masking of the transducer, and means for determining the level of the sound wave that the transducer must produce given the measurement effected by the measuring means.

3. A mobile radio terminal according to claim 2, wherein the means for measuring a parameter representative of the degree of masking of the transducer comprises means for measuring the attenuation of background noise picked up by the microphone of the terminal.

4. A mobile radio terminal according to claim 2, wherein the means for measuring a signal representative of the degree of masking of the transducer comprises means for measuring the impedance of the transducer.

5. A mobile radio terminal according to claim 1, wherein the adjustment means comprise:

a flap in which the transducer is mounted and which is coupled to the front face of the terminal and mobile between an active position in which it bears against the front face and an inactive position in which it does not bear against the front face, means for detecting passage from the inactive position to the active position and vice-versa, and means for producing a signal for adjusting the level of the sound wave from the transducer according to the position of the flap.

6. A mobile radio terminal according to claim 2, wherein the adjustment means comprise means for emitting a ringing burst whose level increases gradually to a level determined by the degree of masking of the transducer.

7. The method according to claim 1, wherein the adjustment of the sound wave level is effected in accordance with the degree of masking of the transducer.

8. The method according to claim 7, the method further comprising:

measuring a parameter representative of the degree of masking of the transducer, and adjusting the level of the sound wave that the transducer must provide accordingly.

9. The method according to claim 8, wherein the measured representative parameter is the attenuation of background noise picked up by the microphone of the terminal.

10. The method according to claim 8, wherein the measured representative parameter is the impedance of the transducer.

11. The method according to claim 1, wherein the adjustment of the sound wave level is effected by diverting at least part of the sound wave in a secondary direction different from the main direction.

12. The method according to claim 1, wherein the adjustment of the sound wave level is effected on detecting a pressure difference applied to the front face of the terminal.

13. The method according to claim 7, wherein, when an incoming call reaches the terminal, a ringing burst is emitted whose level increases gradually to a maximum level, the parameter representative of the degree of masking of the transducer being measured during emission of the ringing burst to determine the level of the sound wave that the transducer must supply according to the degree to which it is masked.

14. The method according to claim 7, wherein the parameter representative of the degree of masking of the transducer is measured cyclically.

15. A mobile radio terminal comprising a microphone, an audio transducer providing earpiece, loudspeaker and ringer functions and an outlet that is oriented towards the front face of the terminal, the mobile radio terminal further comprising:

a measuring circuit coupled to the transducer that adjusts sound wave level emitted by the transducer in a main direction substantially perpendicular to the front face; and an adjustment circuit compares an attenuation of background noise picked up by the microphone to a predetermined threshold value to adjust the sound wave level, said predetermined threshold value corresponding to the attenuation caused by the masking of said audio transducer.

16. The mobile radio terminal according to claim 15, wherein the measuring circuit comprises a circuit that measures the background noise captured by the microphone.

17. The mobile radio terminal according to claim 16, wherein the measuring circuit comprises an amplifier coupled to the microphone.

18. The mobile radio terminal according to claim 15, wherein the adjustment circuit comprises:

a comparator that compares an output of the measuring circuit to the predetermined threshold value; and an amplifier coupled to an output of the comparator.

19. The mobile radio terminal according to claim 15, wherein the measuring circuit comprises:

a first circuit that measures the background noise captured by the microphone; and a resistance circuit coupled to the first circuit and the transducer, wherein the resistance circuit is used to measure the impedance of the transducer.

20. The mobile radio terminal according to claim 15, wherein the terminal further comprises a guide member for the sound wave comprising a guide wall in which at least one guide hole is formed, the guide member being coupled to the front face of the terminal so that the guide hole faces the outlet of the transducer to limit the level of the sound wave emitted in the main direction, and the guide wall and the front face of the terminal provide a diversion channel for at least a portion of the sound wave in a secondary direction different to the main direction.

21. A mobile radio terminal according to claim 20, further comprising:

a flap in which the transducer is mounted and which is coupled to the front face of the terminal and mobile between an active position in which it bears against the front face and an inactive position in which it does not bear against the front face;

a switch that detects a change from the inactive position to the active position and vice-versa; and a circuit for producing a signal for adjusting the sound wave level from the transducer according to the position of the flap.

22. A mobile radio terminal according to claim 15, wherein the measuring circuit emits a ringing burst whose level increases gradually to a level determined by the degree of masking of the transducer.

* * * * *